United States Patent [19]

Abe et al.

[11] Patent Number: 4,805,576

[45] Date of Patent: Feb. 21, 1989

[54] FAULT DETECTION SYSTEM FOR INTERNAL COMBUSTION ENGINE CONTROL APPARATUS

[75] Inventors: Tomoaki Abe, Obu; Mitsunori Takao, Kariya; Masashi Kiyono, Anjo, all of Japan

[73] Assignee: Nippondenso Co., Ltd., Kariya, Japan

[21] Appl. No.: 173,595

[22] Filed: Mar. 25, 1988

[30] Foreign Application Priority Data

Mar. 31, 1987 [JP] Japan .................................. 62-80718

[51] Int. Cl.[4] ........................ F02B 37/12; F02B 77/00; F02P 11/00; G05B 9/02

[52] U.S. Cl. ................................ 123/479; 364/431.11

[58] Field of Search .................... 123/479, 630, 148 D, 123/491; 364/431.11, 437.03, 431.07, 431.12, 431.06, 431.01

[56] References Cited

U.S. PATENT DOCUMENTS 4,034,732 7/1977 van Burkleo ........................ 123/630
4,502,447 3/1985 Schnurle et al. .................... 123/630
4,718,389 1/1988 Hönig et al. ........................ 123/479
4,718,395 1/1988 Iwata .................................. 123/630
4,748,566 5/1988 Sasaki et al. ................... 364/431.11
4,748,567 5/1988 Sumizawa et al. ............ 364/431.11

*Primary Examiner*—Raymond A. Nelli
*Attorney, Agent, or Firm*—Cushman, Darby & Cushman

[57] ABSTRACT

A fault detection system for detecting a fault of a subcontrol apparatus as well as a main control apparatus backed up thereby in controlling the operation of an actuator for an internal combustion engine control apparatus such as a throttle control apparatus is disclosed. A second fault detection apparatus for the subcontrol apparatus is made up of a CPU constituting the main control apparatus, so that the fault detection apparatus for the subcontrol apparatus operates under condition that the main control apparatus is normal and the engine is preferably under a light load of operation. Each of the main control and the backup subcontrol apparatuses includes a fault detection apparatus, thereby preventing simultaneous fault of the two control apparatuses for improved safety of the vehicle drive.

16 Claims, 8 Drawing Sheets

FAULT DETECTION SYSTEM FOR INTERNAL COMBUSTION ENGINE CONTROL APPARATUS

BACKGROUND OF THE INVENTION

1. Field of the Invention

The present invention relates to a fault detection system applied to a control apparatus for an internal combustion engine of an automotive vehicle, or more in particular to a system for detecting a fault of a subcontrol apparatus for controlling an actuator in place of a main control apparatus of an internal combustion engine when the main control apparatus becomes out of order.

2. Description of the Prior Art

In a conventional control apparatus for an internal combustion engine, a back-up control apparatus is well known, which is adapted to control an actuator, in place of a main control apparatus, for driving an equipment included in the internal combustion engine, when the main control apparatus becomes out of order. Such a conventional control apparatus is disclosed, for example, in JP-A-59-196937 and JP-A-60-33989. In the former control apparatus, in the case where a fault develops in a main throttle-control apparatus for controlling an actuator such as a servo motor for driving the throttle valve of an internal combustion engine mounted in a vehicle, the actuator is controlled by a back-up subcontrol apparatus thereby to secure the driving safety of the vehicle. The latter control apparatus, on the other hand, operates on principle that in the case where a fault develops in a control circuit for controlling an electromagnetic fuel injection valve in an internal combustion engine, pulse signals are produced from a pulse generator separated from the control circuit to control the electromagnetic fuel injection valve in place of the control circuit thereby to permit minimum drive. Assume, however, that the back-up control apparatuses disclosed by the prior arts develop a fault before the main control apparatus becomes out of order. The internal combustion engine would be controlled by the faulty back-up control apparatus, thus causing an unusual operation of the internal combustion engine. As a result, the vehicle would not be capable of performing relief drive, thereby making it impossible to secure the driving safety of the vehicle.

SUMMARY OF THE INVENTION

An object of the present invention is to provide a fault detection system for securing a high driving safety and reliability of a vehicle by eliminating simultaneous troubles of a main control apparatus and a back-up subcontrol apparatus for controlling an actuator of an internal combustion engine.

Another object of the present invention is to provide a fault detection system for each of a main control apparatus and a back-up subcontrol apparatus for controlling an actuator of an internal combustion engine, of which the fault detection system for the subcontrol apparatus is realized by use of a CPU for main control apparatus.

According to the present invention, there is provided a fault detection system for a control apparatus of an internal combustion engine, comprising an actuator for driving an equipment of the internal combustion engine, main control means for producing a main control signal for controlling the actuator, first fault detection means for detecting a fault of the main control means, subcontrol means for producing a subcontrol signal for controlling the actuator in place of the main control means upon detection of a fault of the main control means by the first fault detection means, and second fault detection means for detecting a fault of the subcontrol means in response to a driving condition signal representing the driving condition of the actuator in accordance with the subcontrol signal produced from the subcontrol means of the very subcontrol signal itself produced from the subcontrol means when a fault of the main control means is not detected by the first fault detection means.

According to the configuration described above, upon detection of a fault of the main control means by the first fault detection means, the actuator comes to be controlled by the subcontrol means. Further, if the subcontrol means develops a fault while the main control means is normal, the fault of the subcontrol means is detected by second fault detection means.

DESCRIPTION OF THE PREFERRED EMBODIMENTS

An embodiment of the present invention will be explained below with reference to the accompanying drawings.

Figure 1:
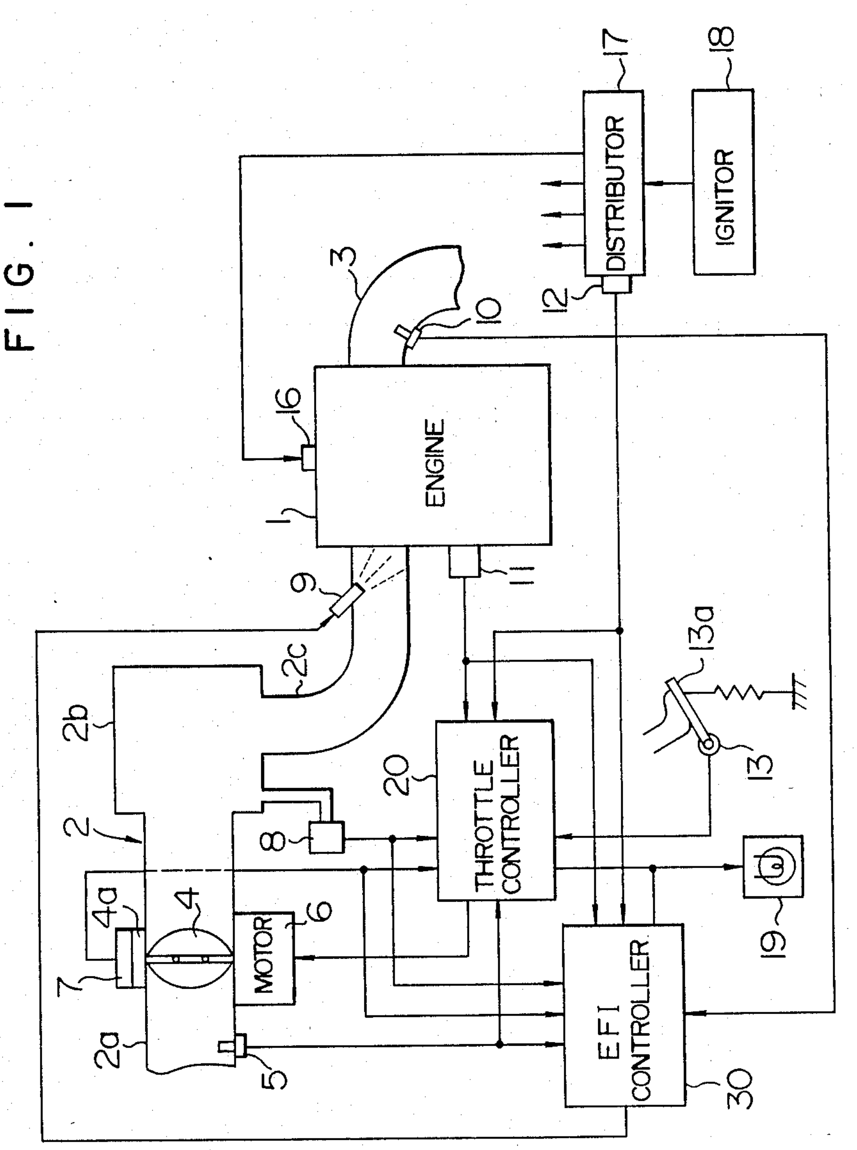
FIG. 1 is a diagram showing a configuration of an internal combustion engine and a surrounding equipment according to the present invention.

FIG. 1 is a diagram showing a general configuration of an embodiment. Reference numeral 1 designates a four-cylinder engine of spark ignition type mounted on a vehicle, which engine 1 is connected with an intake manifold 2 and an exhaust pipe 4.

The intake manifold 2 includes a collecting pipe **2*a*, surge tank 2*b* and a branch pipe 2*c* branching among the cylinders of the engine 1. The collecting pipe 2*a* of the intake manifold 2 is provided with an air cleaner not shown in the most upstream side thereof and a throttle valve 4 for adjusting the amount of air taken into the engine at the downstream side thereof. Also, an intake air temperature sensor 5 for detecting the temperature of intake air is disposed on the pipe of the air cleaner and the throttle valve 4. Further, the outer peripheral wall of the collecting pipe 2*a* carries a reversible motor 6 as an actuator for driving the throttle valve, having a rotor coupled to the rotary shaft of the throttle valve 4. This motor 6 is made up of, for example, a step motor or a DC motor. The rotary shaft of the throttle valve 4 also carries at the other end thereof a spring 4*a*** for urging the throttle valve 4 toward the closed-up direction and an opening degree sensor 7 for detecting an actual opening degree of the throttle valve and producing an analog signal corresponding to the opening degree of the throttle valve 4.

The surge tank 2*b* is connected with an intake air pressure sensor 8 for detecting the intake air pressure in the surge tank, and each branch pipe 2*c* is provided with an injection valve 9 of electromagnetic type for injecting fuel to a point near an intake valve (not shown) of the engine 1.

The exhaust pipe 3 includes an air-fuel ratio sensor 10 for detecting the air-fuel ratio from the residual oxygen concentration of the exhaust gas.

The engine 1 further includes a water temperature sensor 11 for detecting the temperature of the engine cooling water and an ignition plug 16.

The ignition plug 16 is connected to a distributor 17 so that the high voltage generated in an ignitor 18 is applied to the ignition plug 16 through the distributor 17.

The distributor 17, on the other hand, is provided with an engine speed sensor 12 for generating a pulse signal corresponding to the rotational speed of the engine 1.

Numeral 20 designates a throttle controller for controlling the opening degree of the throttle valve 4 with the essential parts thereof made up of a microcomputer. This throttle controller is supplied with signals representing engine operating conditions from the sensors and produces a drive signal for the motor 6. The throttle controller 20 is also supplied with a signal corresponding to the amount of operation of an acceleration pedal 13*a* operated by the driver from the acceleration sensor 13.

Numeral 30 designates an EFI controller with an essential parts thereof made up of a microcomputer like the throttle controller 20 for executing the fuel injection control. This EFI controller is also supplied with signals representing engine operating conditions from the respective sensors.

Numeral 19 designates an alarm lamp which is lit by the throttle controller 20 or the EFI controller 30.

Figure 2:
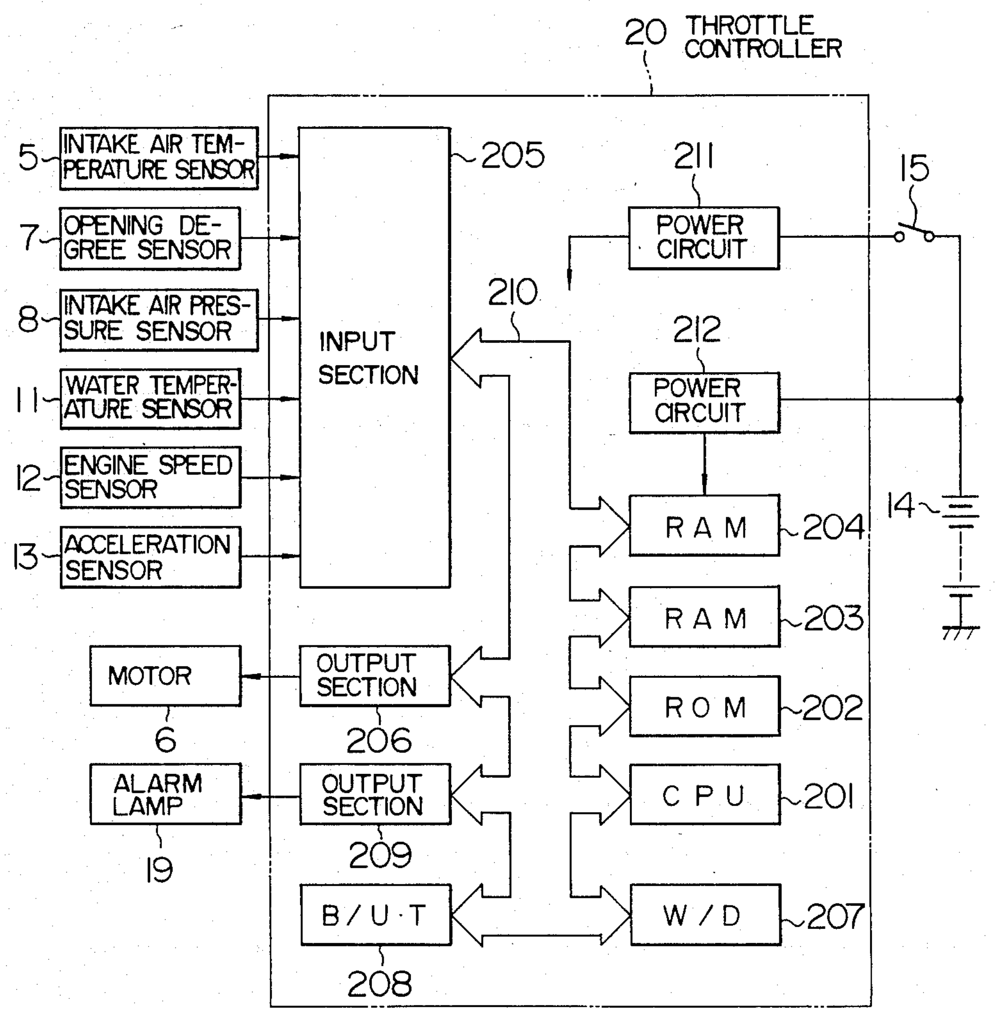
FIG. 2 is a block diagram showing a general configuration of a throttle valve controller shown in FIG. 1.

A main configuration of the throttle controller 20 is generally shown in FIG. 2. Numeral 201 designates a central processing unit (CPU) for controlling the throttle valve by controlling the drive of the motor 6 on the basis of signals from the intake air temperature sensor 5, the opening degree sensor 7, the intake air pressure sensor 8, the water temperature sensor 11, the engine speed sensor 12 and the acceleration sensor 13. Numeral 202 designates a read-only memory (ROM) exclusively used for reading constants and data used for processing at the CPU 201, and numerals 203, 204 a random access memory (RAM) capable of writing the result of operation in the CPU 201 and the data detected by the sensors temporarily. Numeral 205 designates an input section for receiving signals from the sensors on the one hand and A/D conversion of the signals or processing such as by shaping the waveform thereof on the other. Numeral 206 designates an output section for receiving a control signal corresponding to the result of processing executed at the CPU 201 and producing a signal for driving the motor 6. Numeral 207 designates a watch dog (W/D) circuit for detecting a fault of the CPU 201. Numeral 208 designates a back-up circuit for controlling the throttle valve (B/U.T) which controls the drive of the motor 6 in place of the CPU 201 upon detection of a fault of the CPU 201 by the W/D 207. Numeral 209 designates an output section for lighting the alarm lamp 18 in the case where a fault is detected by the throttle valve control system. Numeral 210 designates a common path connecting the CPU 201, the ROM 202, the RAMs 203 and 204, the input section 205, the output sections 206, 209, the W/D 207 and the B/U.T 208 and used for mutual transmission of data signals. Numerals 211 and 212 designate power circuits, of which the power circuit 211 is connected through an IG switch operated by the driver to the battery 14 to supply power to the CPU 201, the ROM 202, the RAM 203, the input section 205, the output sections 206, 209, the W/D 207 and the B/U.T 208, while the power circuit 212 is connected to the battery 14 bypassing the IG switch 15 to supply power to the RAM 204. As a result, the RAM 204 is capable of holding memory thereof even when the IG switch 15 is turned off.

Figure 3:
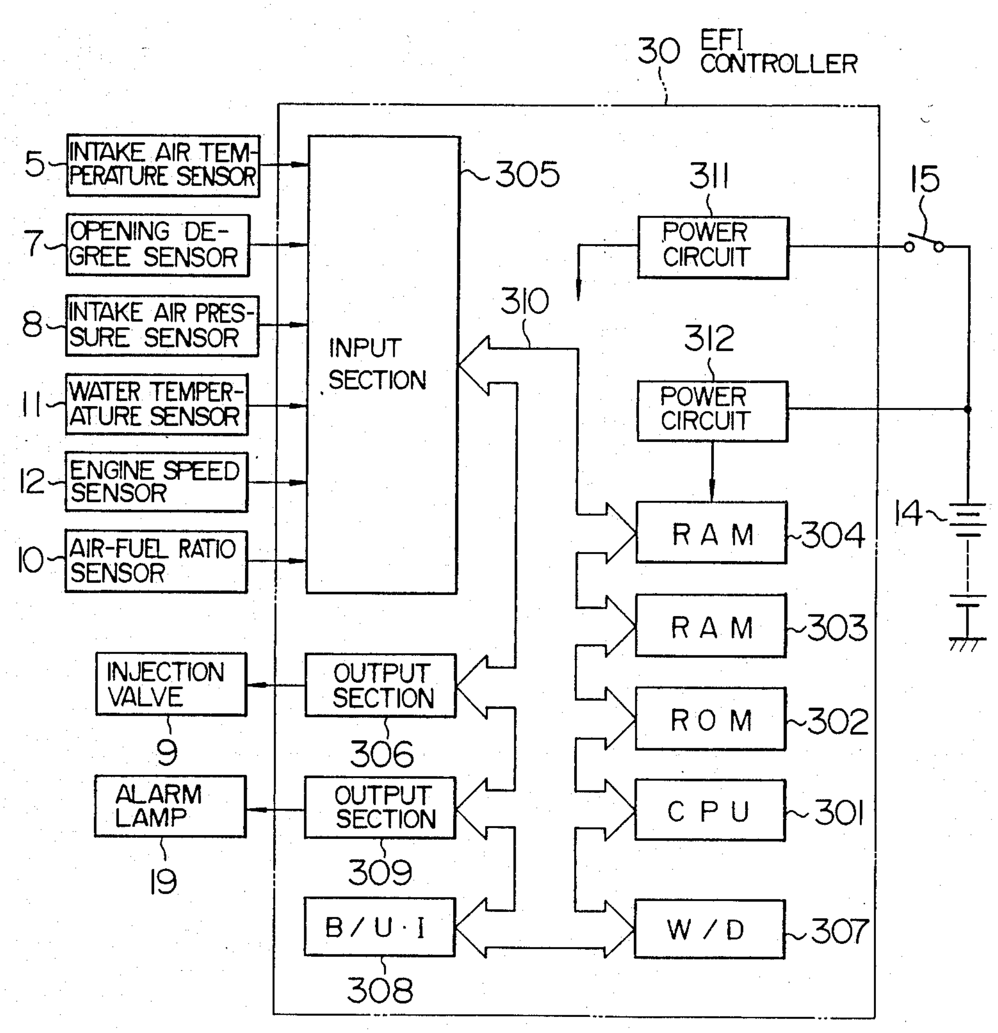
FIG. 3 is a block diagram showing a general configuration of an EFI controller shown in FIG. 1.

A main configuration of the EFI controller 30 is generally shown in FIG. 3. The EFI controller 30, which is similar to the throttle controller 20 in configuration, includes a CPU 301, a ROM 302, RAMs 303, 304, an input section 305, output sections 306 and 309, a W/D 307, a fuel injection control back-up circuit (B/U.I) 308, a common path 310, and power circuits 311, 312. This EFI controller 30 is supplied at the input section 305 thereof with signals from the intake air temperature sensor 5, the opening degree sensor 7, the intake air pressure sensor 8, the air-fuel ratio sensor 10, the water temperature sensor 11 and the engine speed sensor 12. When there is not fault of the CPU 301 detected by the W/D 307, the CPU 301 calculates the amount of fuel injection on the basis of the signals from the sensors and a control signal is applied to the output section 306 which in turn applies a drive signal corresponding to the control signal to the injection valve 9. If a fault of the CPU 301 is detected by the W/D 307, by contrast, the B/U.I 308 applies a control signal to the output section 306 for controlling the fuel injection valve 9 in place of the CPU 301.

Now, the processing at the throttle valve controller 20 configured as above and the resulting operation will be explained with reference to FIG. 4.

Figure 4:
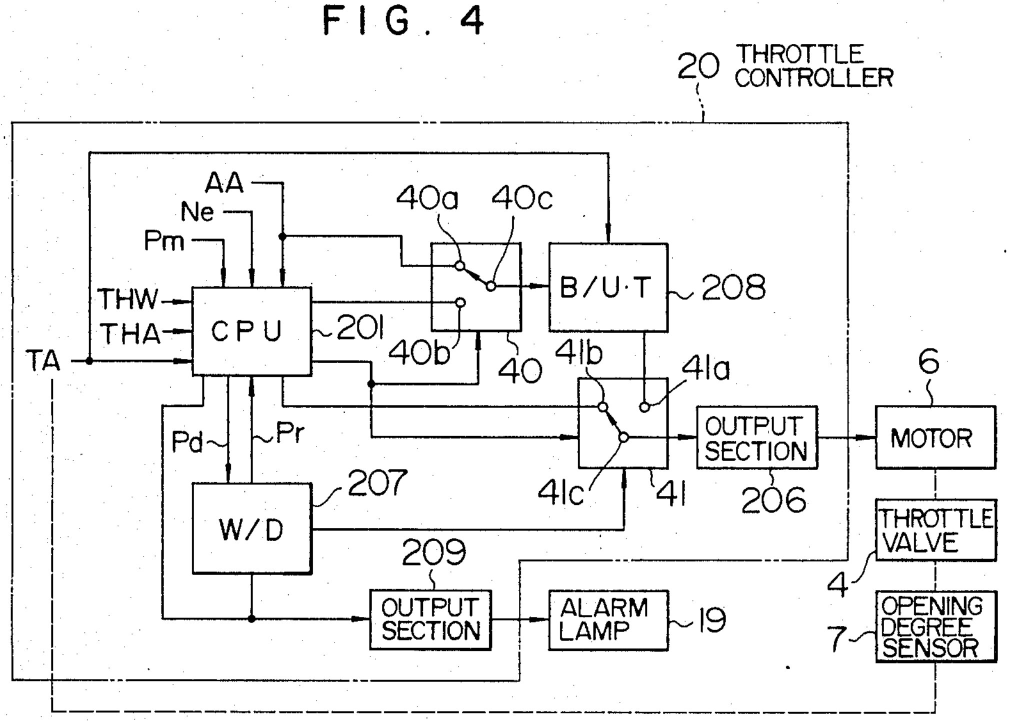
FIG. 4 is a block diagram based on the operation of the throttle valve controller shown in FIG. 2.

In FIG. 4, the CPU 201 is supplied with various input signals (amount of accelerator pedal amount AA, engine speed Ne, intake air pressure Pm, water temperature THW, intake air temperature THA and throttle opening degree TA) from the input section 205. The CPU 201 is so programmed as to apply an operation pulse Pd to the W/D 207 at regular intervals of time (such as every 20 ms). If this operation pulse Pd is interrupted for a predetermined length of time (such as 100 ms), the W/D 207 applies a reset pulse Pr to the CPU 201. If the CPU is actuated falsely by a noise or the like, it is initialized by this reset pulse Pr and restores normal operation.

Figure 5:
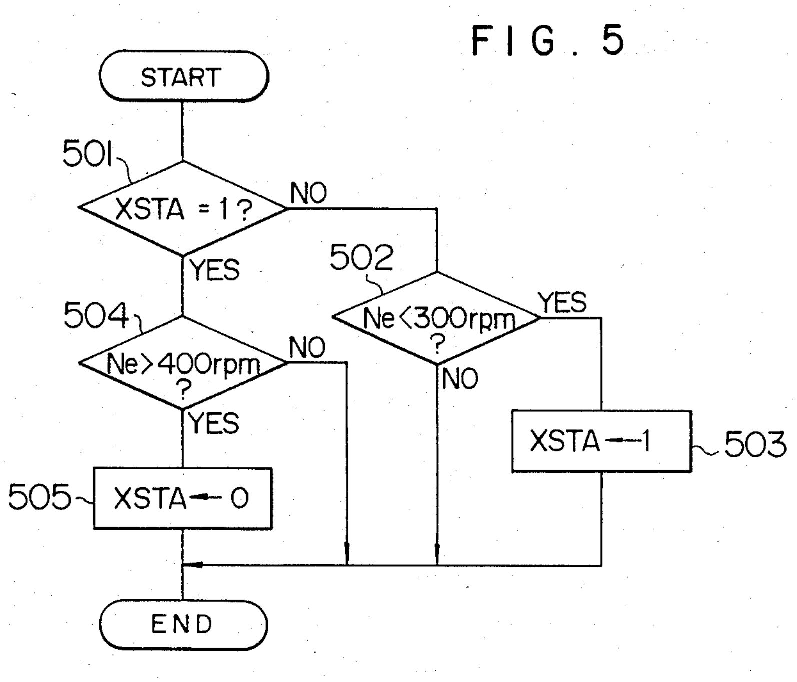
FIGS. 5, 8 and 9 are flowcharts showing a program executed by the CPU shown in FIG. 4.

Further, a program shown in the flowchart of FIG. 5 is executed in the CPU 201 at regular intervals of, say, 50 ms for decision on starting. First, step 501 decides whether "1" is set in the start decision flag XSTA, and if "1" is set therein, the process is passed to step 504, while if it is set at "0", to step 502. Step 502 ends the process deciding that the starting state has been completed if the engine speed Ne is higher than 300 rpm, while if the engine speed Ne is lower than 300 rpm, the XSTA is set to "1" by deciding that the starting state is continuing, thus ending the process. Step 504 resets the XSTA to "0" to end the process by deciding that the starting state is over if the engine speed Ne is higher than 400 rpm, while in the other case, the process is ended by deciding that the starting system is still continuing. By executing this routine, a starting condition is decided with hysteresis at the engine speeds of 300 rpm and 400 rpm.

If a starting state is not decided in the foregoing step and there is no fault of the CPU 201 detected at the W/D 207, then the CPU 201 determines a target opening degree by correcting the basic opening degree associated with the amount of accelerator pedal operation AA and engine speed Ne in accordance with the intake air pressure Pm, water temperature THW and the intake air temperature THA, and comparing this target opening degree with the throttle valve opening degree TA, and applies a control signal corresponding to the result of the comparison through a switch 41 to the output section 206. As a result, the output section 206 applies a drive signal corresponding to the control signal to the motor 6, whereby the motor 6 drives the throttle valve 4 to a predetermined opening degree. In the process, the opening degree sensor 7 detects the opening degree of the throttle valve 4, and the CPU 201 introduces thereinto the detection value as a throttle valve opening degree TA again for feedback control.

The W/D 207, when it has applied more than a predetermined number (say, three) of reset pulses Pr within a predetermined length of time (say, 30 seconds) to the CPU 201, decides that the CPU 201 is faulty, and separates the CPU 201 from the control system for the throttle valve 4, while at the same time switching the connection of the switch 41 in such a manner as to connect the terminals 41*a* and 41*c* of the switch 41, thereby causing the B/U.T 208 to control the throttle valve 4 in placed of the CPU 201. By doing so, the throttle valve 4 is driven by the control signal from the B/U.T 208 for back-up operation.

Figure 6:
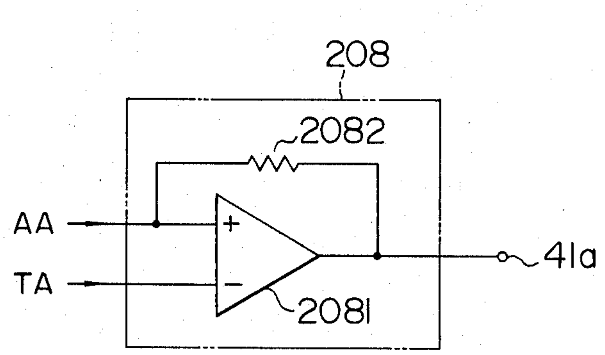
FIGS. 6 and 7 are circuit diagrams showing an example of a configuration of a B/U.T.

A configuration of the B/U.T 208 with a DC motor used as the motor 6 is shown in FIG. 6. In this case, a voltage signal representing the amount of accelerator pedal operation AA is applied through the switch 40 to one input terminal of a differential amplifier 2081 (OP amp) of the B/U 208, and a voltage signal representing the throttle opening degree TA to the other input terminal thereof. Thus a control signal for controlling the motor 6 is produced from the OP amplifier 2081 so that the voltage signal for the throttle valve opening degree TA may be equal to the voltage signal representing the amount of accelerator pedal operation AA. A resistor 2082 for providing hysteresis to the output of the OP amplifier 2081 is inserted between the input and output terminals of the OP amplifier 2081 for the signal representing the amount of accelerator pedal operation AA.

Figure 7:
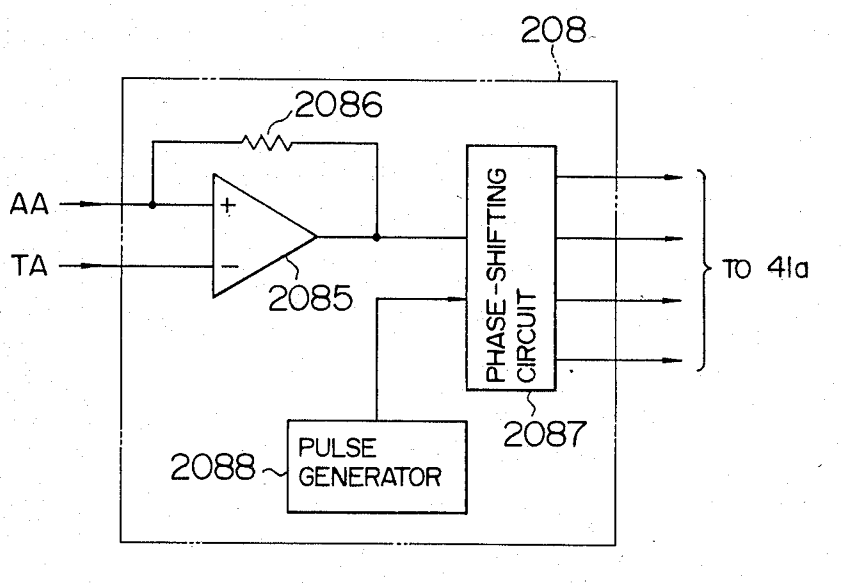

FIG. 7 shows a configuration of the B/U.T 208 with a step motor used as the motor 6. In this case, as in the configuration of FIG. 6, an OP amplifier 2085 and a resistor 2086 are inserted. An output of the OP amplifier 2085 is applied to a phase shifting circuit 2087, which in turn produces a pulse signal for exciting each winding of the motor 6. A pulse generator 2088 is for supplying the phase shifting circuit 2087 with a pulse signal defining the output period of the control pulse signal produced from the phase shifting circuit 2087. The pulse generator 2088 thus applies to the phase shifting circuit 2087 a defining pulse signal in such a way that the output period of the control pulse signal from the phase shifting circuit 2087 is produced in a lower frequency than under normal operation by the CPU 201, thus driving the motor 6 more accurately than under normal operation.

The switch 40 is connected at the shown position, that is, between the terminals 40*a* and 40*c*, as long as no command is given thereto from the CPU 201 as predetermined.

As a result, in the case of a fault of the CPU 201, the motor 6 is driven by a control signal from the B/U.T 208, thereby driving the throttle valve 4 in accordance with the accelerator pedal operation.

Upon detection of a fault of the CPU 201, the W/D 207 applies an output signal to the output section 209 to light the alarm lamp 19, thus informing the driver of the fault.

Figure 8:
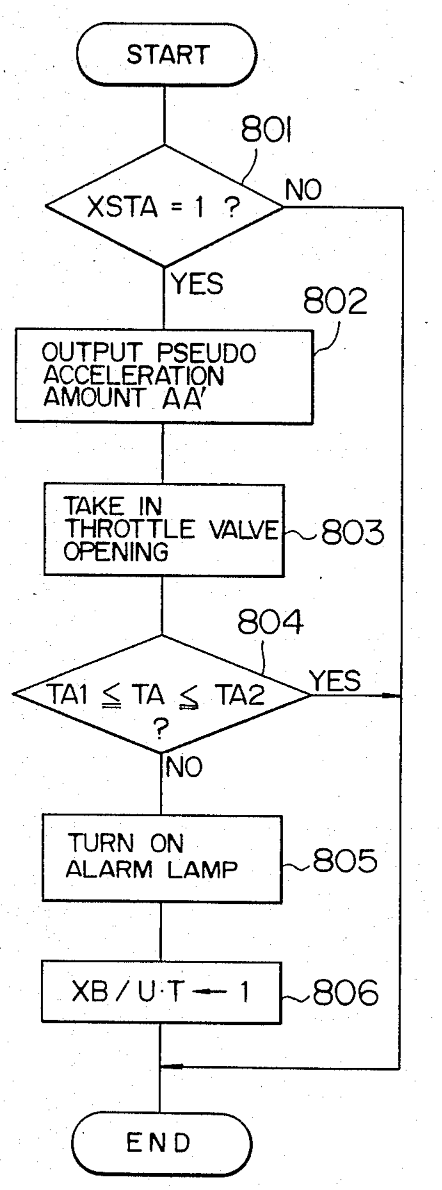

Now, assume that there is no fault of the CPU 201 detected by the W/D 207, and that the above-mentioned process of starting decision decides on a starting condition. The CPU 201 executes the check routine for the B/U.T 208 shown in FIG. 8 at least once, or preferably at predetermined intervals of time (such as 100 ms), during the starting state. In the meantime, the CPU 201 changes the state of the switch 40 to connect the terminals 40*a* and 40*c*, and that of the switch 41 to connect the terminals 41*a* and 41*c*, followed by the execution of this check routine. First, step 801 checks to see whether "1" is set in the starting decision flag XSTA in the foregoing starting decision process, and if "1" is not set, ends this routine, while if "1" is set, proceeds to step 802. Step 802 applies a pseudo amount of accelerator pedal operation AA' to the B/U.T 208, whereby the motor 6 is controlled by a control signal from the B/U.T 2088 thereby to drive the throttle valve 4 to a predetermined opening degree, which is sufficiently low to effect smooth start. Step 803 takes in the resulting throttle opening degree TA, followed by step 804 to decide whether the throttle valve opening degree TA is within a predetermined range ($TA1 \leqq TA \leqq TA2$). If the throttle valve opening degree TA is included in this range, the process ends there, while the process proceeds to step 805 otherwise. Step 805 produces a signal to the output section 209 and turns on the alarm lamp 19 on the assumption that a fault of the B/U.T 208 is detected. Step 806 sets "1" in the flag XB/U.T for prohibiting the operation of the B/U.T 208 in the RAM 204, thus preventing further operation of the B/U.T 208.

As explained above, the CPU 201 checks to see whether the B/U.T 208 is faulty or not according to the throttle valve opening degree TA with the motor 6 driven by the B/U.T 208 when the CPU 201 is normal in starting state, thereby preventing a double fault of the CPU 201 and the B/U.T 208. As a result, the safety and reliability of the vehicle drive are improved remarkably. When a fault of the B/U.T 208 is detected, by the way, "1" is set in the flag XB/U.T prohibiting the operation of the B/U.T 208 in the RAM 204 holding the memory for engine stop, and therefore even after the engine 1 is stopped and restarted, the B/U.T 208 remains off. If the above-mentioned check of the B/U.T 208 detects a fault thereof, the CPU 201 immediately changes the switch 41 to connect the terminals 41*b* and 41*c*.

In the aforementioned embodiment, the B/U.T 208 is checked in starting condition. This is because it is desirable to check the B/U.T 208 by the CPU 201 in an operating condition where the load of the CPU 201 is not yet heavy. Also, since the engine starting operation is performed before driving the vehicle, an alarm could be given to the driver before the drive of the vehicle.

Thus checking in engine start is very preferable to secure safety.

Figure 9:
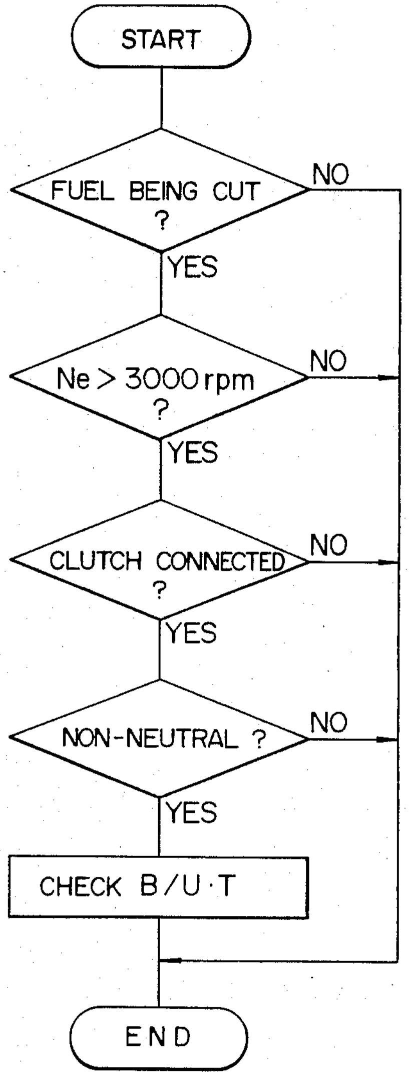

Nevertheless, instead of checking the B/U.T 208 in starting state, it may alternatively be checked while the vehicle is running if it does not impose much burden on the CPU 201. As shown in FIG. 9, for example, the B/U.T 208 may be checked while fuel is cut by deceleration, immediately after decision that the fuel cut may be continued for some time (Ne higher than 3000 rpm with clutch in at other than neutral position). In such a case, however, there are needed means for detecting the clutch condition and the gear position.

Figure 10:
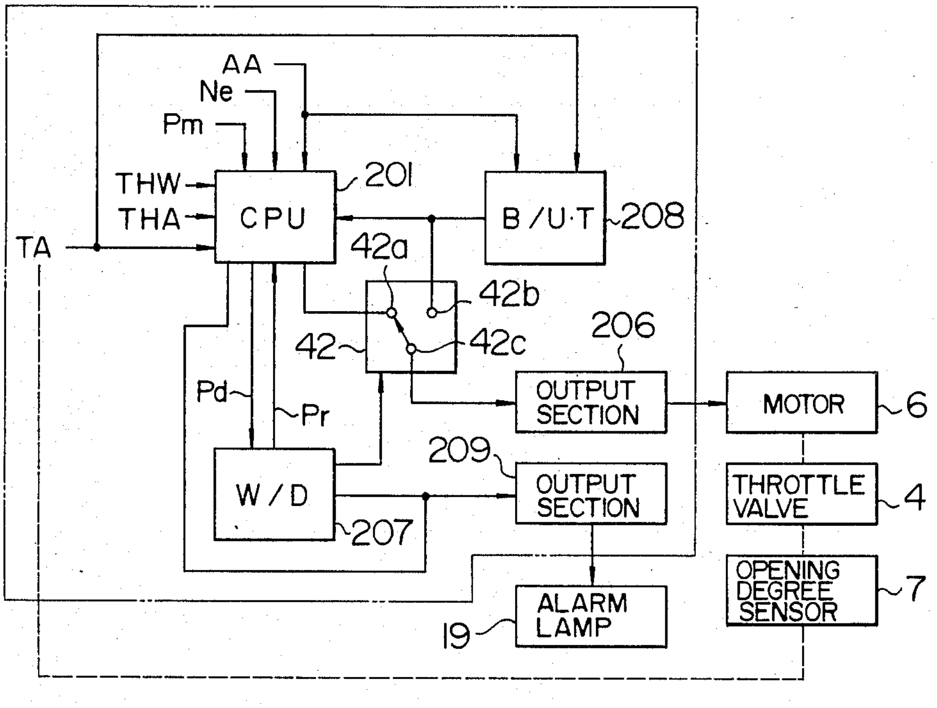
FIG. 10 is a block diagram of another embodiment based on the operation of the throttle valve controller shown in FIG. 2.
Figure 12:
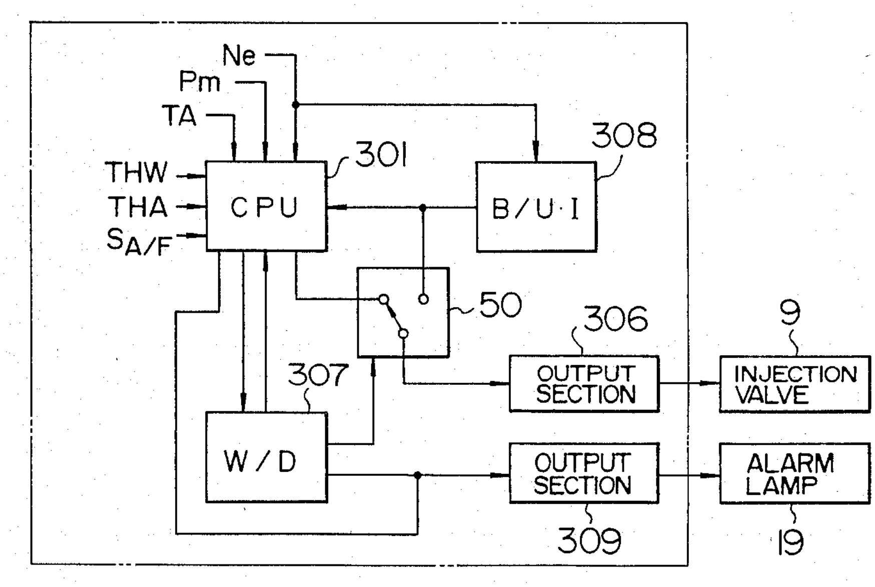
FIG. 12 is a block diagram based on the operation of the EFI controller shown in FIG. 3.

Now, another embodiment will be explained with reference to FIG. 10. In this embodiment, the CPU 201 and the B/U.T 208 is kept directly connected and the CPU 201 takes in at regular intervals of time a control signal produced by the B/U.T 208 in response to the amount of accelerator pedal operation AA and the throttle opening degree TA. The CPU 201 thus checks the control signal from the B/U.T 208 regularly.

Figure 11:
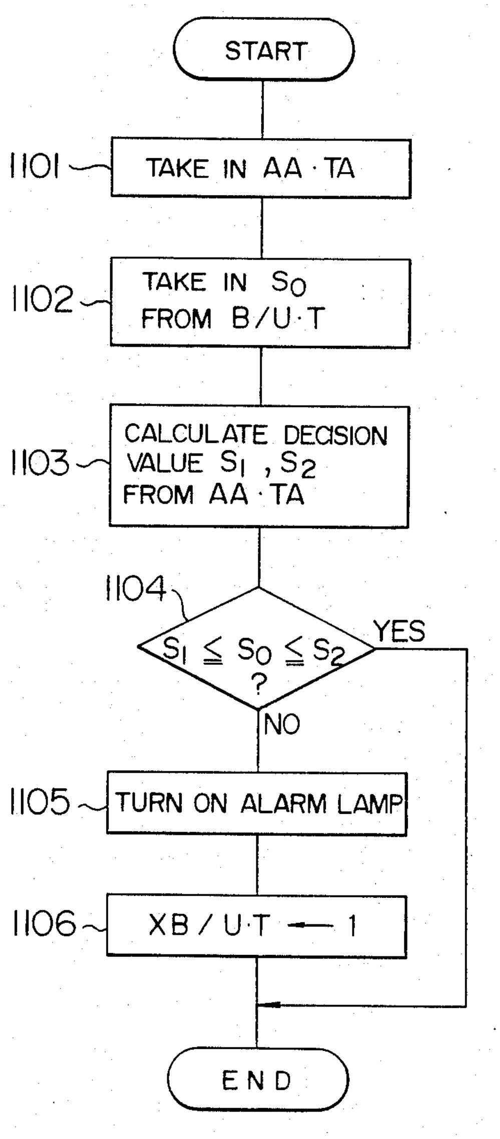
FIG. 11 is a flowchart of a program executed in the CPU shown in FIG. 10.

FIG. 11 shows a check routine for the B/U.T 208. When no fault of the CPU 201 is detected by the W/D 207 in starting state, this routine is executed. After that, the routine is also executed at regular intervals of, say, 100 ms. First, step 1101 takes in the amount of accelerator pedal operation AA and the throttle opening degree TA. Step 1101 takes in the control signal S0 from the B/U.T 208. Step 1103 determines decision values $S_1$, $S_2$ ($S_1<S_2$) from the amount of accelerator pedal operation AA and the throttle valve opening degree TA taken in at step 1101. Step 1104 compares the decision values $S_1$, $S_2$ with the control signal $S_0$ (more specifically, a control value associated with the control signal $S_0$), and if $S_1 \leqq S_0 \leqq S_2$, the subsequent steps are circumvented to end the whole process. If $S_0<S_1$ or $S_2<S_0$, on the other hand, the process proceeds to step 1105, where a signal is applied to the output section 209 to turn on the alarm lamp 19, and step 1106 sets "1" in the flag XB/U.T prohibiting the B/U.T operation in the RAM 204 to end the routine.

If a fault of the CPU 201 is not detected by the W/D 207 when the B/U.T 208 is normal, the switch 42 is connected at the position shown, that is, between the terminals 42*a* and 42*c*, so that a process similar to the one mentioned above with reference to the foregoing embodiment is executed to apply a resultant signal from the CPU 201 through the switch 42 to the output section 206. In the case where a fault of the CPU 201 is detected by the W/D 207 while the B/U.T 208 is normal as in the aforementioned embodiment, on the other hand, the W/D 207 changes the position of the switch 42 to connect the terminals 42*b* and 42*c*, with the result that the process proceeds to the back-up operation while at the same time turning on the alarm lamp 19.

In this embodiment, a fault of the B/U.T 208 is detected by the CPU 201 on the basis of a control signal from the B/U.T 208, and therefore the fault detection of the B/U.T 208 can be performed regularly irrespective of the engine operating conditions, so that any fault of the B/U.T 208 that may occur while the vehicle is running is immediately notified to the driver.

Although the B/U.T 208 is checked at regular intervals of 100 ms in the embodiment under consideration, such a check of the B/U.T 208 may alternatively executed at regular distance coverage of 100 m.

In the above-mentioned configuration of the embodiment under consideration, the EFI controller 30 is also equipped with a B/U.I 308, which is also checked by the CPU 301 when no fault of the CPU 301 is detected by the W/D 207. As shown in FIG. 21, therefore, a process similar to the one of the embodiment shown in FIG. 10 is executed. More specifically, the B/U.I 308 is made up of, for instance, a monostable multivibrator to produce a control signal with an injection pulse duration covering the minimum required drive of the vehicle in response to the engine speed signal Ne every engine revolution. The CPU 301 compares the pulse duration of the control signal of the B/U.I 308 at regular intervals of time with a set value stored in advance thereby to detect a fault of the B/U.I 308.

In place of executing the start decision on the basis of the engine speed signal Ne in the embodiment of FIG. 4, such a start decision may be effected with a starter switch separately provided for detecting the operation of the starter.

Further, apart from the foregoing description of an example of the present invention applied to control of fuel injection and throttle control, the present invention may of course also applicable to the control of other engine functions including ignition timing, idle speed and exhaust gas reflux.

We claim:

1. A fault detection system for an internal combustion engine control apparatus comprising
   - an actuator included in an internal combustion engine,
   - main control means for controlling the actuator,
   - first fault detection means for detecting a fault of the main control means,
   - subcontrol means for controlling the actuator in place of the main control means only when a fault of the main control means is detected by the first fault detection means, and
   - second fault detection means for detecting a fault of the subcontrol means on the basis of selected one of a driving condition signal representing the drive of the actuator controlled by a control signal produced from the subcontrol means and the control signal produced from the subcontrol means.

2. A fault detection system according to claim 1, wherein the second fault detection means is included in the main control means, and detects a fault of the subcontrol means by deciding on the driving condition signal produced in correspondence with a signal representing an operation amount applied from the main control means to the subcontrol means.

3. A fault detection system according to claim 1, wherein the fault-detecting operation of the second fault detection means is effected when the internal combustion engine is under a light load of operation.

4. A fault detection system according to claim 3, wherein the internal combustion engine is under a light load of operation in the starting state.

5. A fault detection system according to claim 3, wherein the internal combustion engine is under a light load of operation with fuel cut by deceleration.

6. A fault detection system according to claim 1, wherein the second fault detection means is included in the main control means and detects a fault of the subcontrol means by comparing a control signal produced from the main control means and the control signal produced from the subcontrol means on the basis of the same data thereto with each other.

7. A fault detection system according to claim 1, further comprising alarm means for issuing an alarm when a fault of the subcontrol means is detected by the second fault detection means and switch means for cancelling the electrical connection with the first subcontrol means.

8. A fault detection system for an internal combustion engine control apparatus, comprising valve means mounted in an intake pipe of the internal combustion engine of a vehicle for adjusting the amount of intake air introduced into the engine, an actuator for driving the valve means, main control means for controlling the actuator, first fault detection means for detecting a fault of the main control means, subcontrol means for controlling the actuator in place of the main control means upon detection of a fault of the main control means by the first fault detection means only when the main control means is faulty, and second fault detection means for detecting a fault of the subcontrol means on the basis of a control signal produced from the subcontrol means when no fault of the main control means is detected by the first fault detection means.

9. A fault detection system according to claim 8, wherein the second fault detection means is included in the main control means and detects a fault of the subcontrol means by comparing a control signal produced from the main control means and a control signal produced from the subcontrol means on the basis of the same input data, with each other.

10. A fault detection system according to claim 8, further comprising means for detecting the amount of the accelerator pedal operation by the driver, wherein the main control means and the subcontrol means produce control signals corresponding to the amount of accelerator pedal operation detected by the accelerator pedal operation amount detection means respectively.

11. A fault detection system for an internal combustion engine control apparatus, comprising valve means mounted in an intake pipe of an internal combustion engine of an automotive vehicle for adjusting the intake air introduced into the engine, an actuator for driving the valve means, main control means for controlling the actuator, first fault detection means for detecting a fault of the main control means, subcontrol means for controlling the actuator in place of the main control means when a fault of the main control means is detected by the first fault detection means, and second fault detection means for detecting a fault of the subcontrol means on the basis of a drive condition signal representing the driving condition of the valve means with the actuator controlled by a control signal produced from the subcontrol means under a predetermined engine operating condition where no fault of the main control means is detected by the first fault detection means.

12. A fault detection system according to claim 11, wherein the second fault detection means is included in the main control means, and detects a fault of the subcontrol means by deciding on the drive condition signal for the valve means produced as a result of the subcontrol means controlling the actuator in response to the operation amount signal applied from the main control means to the subcontrol means.

13. A fault detection system according to claim 11, wherein the fault-detecting operation of the second fault detection means is effected when internal combustion engine is under light load of operation.

14. A fault detection system according to claim 13, wherein the internal combustion engine is under a light load operation in starting state.

15. A fault detection system according to claim 13, wherein the internal combustion engine is under a light load of operation with fuel cut by deceleration.

16. A fault detection system according to claim 11, further comprising means for detecting the amount of accelerator pedal operation by the driver, wherein the main control means and the subcontrol means produce control signals corresponding to the amount of accelerator pedal operation detected by the accelerator pedal operation amount detection means respectively.

* * * * *